United States Patent [19]

Kawamura

[11] 4,455,069

[45] Jun. 19, 1984

[54] CAMERA WITH EE LOCK

[75] Inventor: Masaharu Kawamura, Kanagawa, Japan

[73] Assignee: Canon Kabushiki Kaisha, Tokyo, Japan

[21] Appl. No.: 407,476

[22] Filed: Aug. 12, 1982

[30] Foreign Application Priority Data

Aug. 20, 1981 [JP] Japan .................................. 56-131302
Aug. 20, 1981 [JP] Japan .................................. 56-131303

[51] Int. Cl.³ ............................................ G03B 7/091
[52] U.S. Cl. ...................................... 354/434; 354/458
[58] Field of Search ....................... 354/230, 50, 51, 31, 354/60 R, 60 A

[56] References Cited

U.S. PATENT DOCUMENTS 4,289,389 9/1981 Kobori et al. ......................... 354/31

Primary Examiner—William B. Perkey
Attorney, Agent, or Firm—Toren, McGeady and Stanger

[57] ABSTRACT

In the disclosed camera, a lock selecting arrangement sets a light measuring circuit either into an ordinary photographic mode or a lock mode in which a light measurement at a particular moment is locked so as to set the camera to that measurement despite subsequent changes in brightness.

13 Claims, 4 Drawing Figures

CAMERA WITH EE LOCK

BACKGROUND OF THE INVENTION

1. Field of the Invention

This invention relates to a camera, particularly a camera capable of EE lock photography, i.e., automatically measuring an object brightness and retaining the measurement for setting the camera despite subsequent changes in measurements.

2. Description of the Prior Art

Heretofore, EE lock photography has been used chiefly for back lighted photographs. An operator first approaches the main object under back lighting conditions to measure the brightness of the main object, and sets an EE lock selecting member, such as a button, to memorize the brightness of the main object. The operator then returns to the normal photographic position to compose the picture and then presses a release button to initiate an exposure action. This arrangement is not only complicated but prevents rapid sequence photographs and results in missing opportunities for taking pictures.

SUMMARY OF THE INVENTION

An object of the present invention is to provide a camera in which a light measuring mode of a camera is automatically changed from one for ordinary phototaking to a partial light measuring (a spot light measuring) mode, thereby enabling light measuring of only a main object under back light to be carried out with the camera being held at a photo-taking position, thus eliminating the above-mentioned shortcomings.

Another object of the present invention is to provide a camera in which a new problem arising from the above-mentioned change of a light measuring mode from one for ordinary phototaking (for example, a mean light measuring) to one for EE lock light measuring (for example, a partial or spot light measuring) mode in association with an EE locking operation is eliminated.

That is, a light measuring mode is changed by setting an EE lock selecting member in the present invention. Thus, a certain length of time will be needed until a light measuring output under a light measuring mode after the change becomes stabilized. Therefore, if a light measuring output is memorized immediately after the change, the proper light measuring output will not be obtained. On the other hand, in EE lock photography with a conventional device, the light measuring output is memorized immediately be setting an EE lock selecting member. Thus, a correct light measuring output cannot be memorized using EE locking as mentioned above. This problem constitutes a shortcoming not only for stabilizing the light measuring output itself, but also constitutes a shortcoming when a light measuring output is A/D converted and is digitally memorized.

That is, when a light measuring output is A/D converted a prescribed period of time will be needed for the A/D conversion operation itself. Also, an input signal itself to be A/D converted changes when the light measuring mode is changed from ordinary photography to EE lock photography. Therefore, a digital value of a correct light measuring output is not formed until the A/D conversion is completed after the mode change. Hence, if the memorizing action is done before the completion of A/D conversion, the memorizing of a digital value correctly corresponding to a light measuring output cannot be accomplished.

The present invention serves for eliminating the above-mentioned shortcoming by providing a camera, in which two kinds of light measuring modes, a light measuring mode for an ordinary photograph (for example, mean photo-sensing) and a light measuring mode for EE lock photography (for example, partial light measuring or spot light measuring), and the light measuring mode is automatically changed to one for EE lock photo-taking by setting an EE lock selecting member so that the brightness of a main object can be measured at a photo-sighting position, and at the same time delay means working when the light measuring mode is changed from one for ordinary photo-taking to one for EE lock photo-taking are provided so that the memorization of a light measuring output is made after an elapse of time controlled by the delay means, thus eliminating the above-mentioned shortcoming.

Other objects of the present invention will be made clear by detailed descriptions of the present invention made hereinafter referring to the accompanying drawings.

DESCRIPTION OF THE PREFERRED EMBODIMENTS

Figure 1:
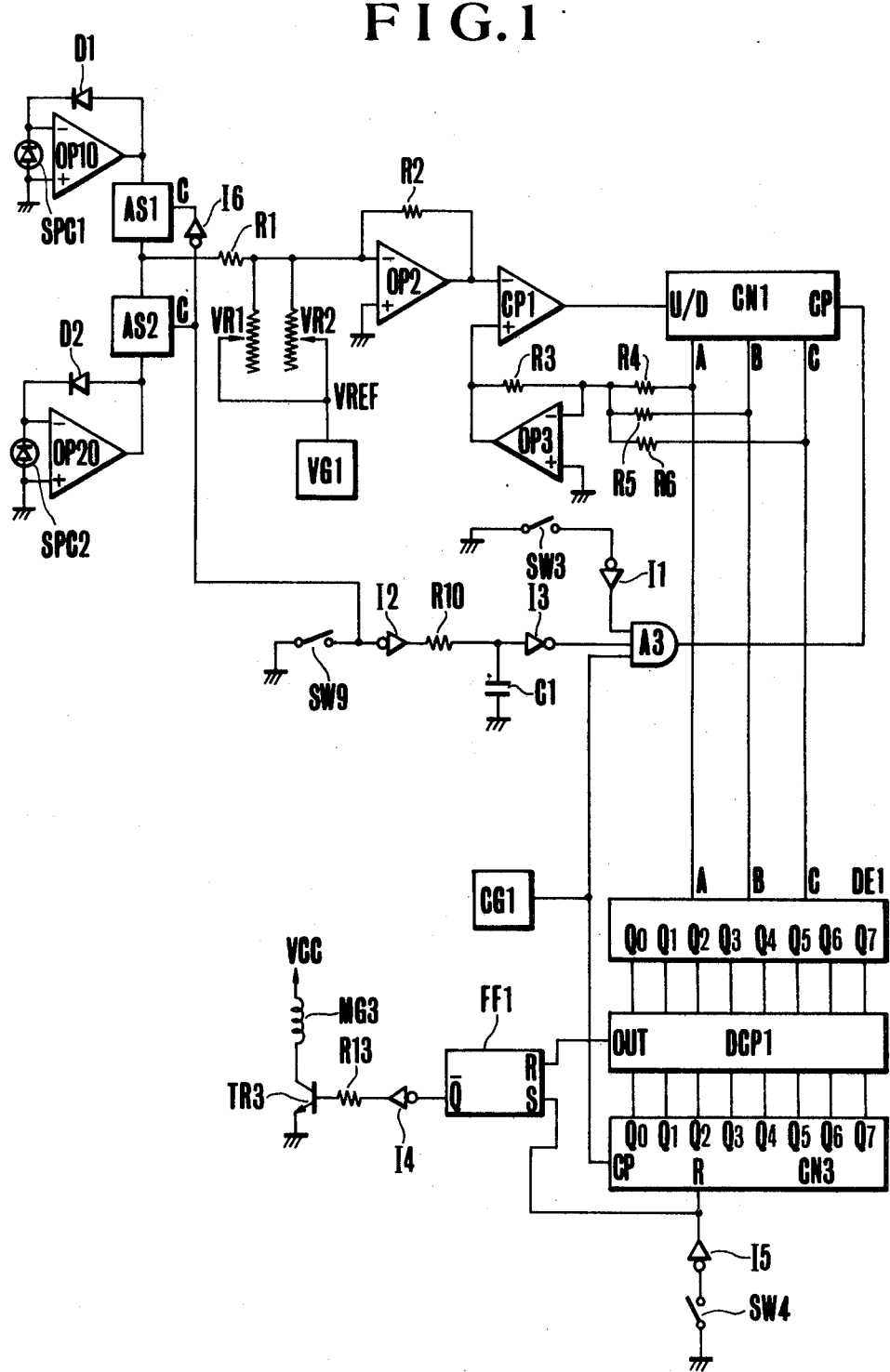
FIG. 1 is a circuit diagram to shown an example of a camera according to the present invention.

FIG. 1 is a circuit diagram showing an example of a camera according to the present invention. In the drawing, a partial light measuring (spot light measuring) and light receiving element SPC1 is connected between input terminals of an operational amplifier (hereinafter called OP Amp) OP10 with a high impedance input. A logarithmic compression diode D1 is connected within a feedback path of the OP Amp OP10. These light receiving elements, OP Amp, diode constitute a partial or spot light measuring circuit and generate an output logarithmically compressing the brightness being measured by partial light measuring. A light receiving element SPC2 performs a mean light measurement and is connected between input terminals of OP Amp OP20. A logarithmic compression diode D2 is connected within a feedback path of the OP Amp OP20. The light receiving element, OP Amp and diode constitute a light measuring circuit for mean light measuring to produce an output logarithmically compressing the brightness being measured by mean light measuring element SPC2.

Circuits AS1 and AS2 are analog switches in the form of FETs, etc. When a high level signal (hereinafter called H signal) is impressed on a control terminal of such a switch, a conductance is secured to transmit outputs of the light measuring circuits to an OP Amp OP2. An inverter I6 is connected between control terminals of the analog switches AS1, AS2, and a switch SW9 associated with an EE lock selecting member, not shown, goes ON when an EE lock mode is selected by the selecting member. These analog switches, inverter and switch constitute a selective changeover circuit for light measuring modes.

A variable resistor VR1 is associated with a film sensitivity setting dial, not shown, and a movable contact piece of the resistor is connected to a constant voltage source VG1 to supply a constant voltage VREF. A variable resistor VR2 is associated with an aperture presetting ring, not shown, and the constant voltage VREF is also supplied to a movable contact piece of the resistor VR2. These variable resistors VR1 and VR2 constitute a preset information setting circuit and voltages corresponding to a film sensitivity information SV and aperture information AV are supplied thereto.

The exposure operation OP Amp OP2 has a resistor R2 connected in its feedback path and its (−) input terminal is connected to output terminals of the analog switches AS1, AS2 through the above-mentioned variable resistors VR1, VR2 and a resistor R1. The OP Amp OP2 performs an operation BV+SV−AV=TV based on the above-mentioned preset information, SV, AV and brightness information BV which is an output of the light measuring circuit being introduced through the analog switches, and produces as its output a voltage inversely proportional to an apex value TV of a shutter time.

A comparator CP1 has its (−) input terminal connected to an output terminal of the OP2 and its (+) input terminal connected to an output terminal of an OP Amp OP3 to be described below. What is shown as CN1 is an up down counter having its up down terminal U/D connected to an output of the comparator CP1 and having its clock terminal CP connected to a clock pulse generator CG1 through an AND gate A3. The up down counter CN1 counts up when an output of the comparator CP1 is at an H level and counts down when it is at a low level (hereinafter called L level). Resistors R4, R5, R6 are ladder resistors connected to output terminals A to C of the up down counter CN1, and the resistance value of each of these resistors is a resistance value of multiple series respectively. Amplifier OP3 is an OP Amp constituting an inversion amplifier having a resistor R3 connected within its feedback path. The comparator, counter, ladder resistors, and OP Amp constitute an A/D converter of a step-following comparison type to convert the output of the OP Amp OP2 to a digital value.

A memory switch SW3 goes OFF immediately before a mirror up action in response to a release operation and is connected to one input terminal of the AND gate A3 through an inverter I1 to turn off the gate immediately before a mirror up action thus prohibiting the input of pulses into the counter. An inverter I2, the switch SW9, the resistor R10, a capacitor C1, and an inverter I3 form a delay circuit for converting the output of the inverter I3 from H to L after an elapse of time determined by the capacitor C1 and the resistor R10 from the moment the switch SW9 goes ON. The delay time of the delay circuit is set to the same length of time necessary for A/D conversion to be completed by the A/D converter or a little longer. The delay circuit insures that even when the switch SW9 goes ON and an EE lock mode is attained and the light measuring mode is changed over, the light measuring output after the changeover action can be A/D converted without fail.

What is shown as DE1 is a decoder having its input terminals A to C connected to output terminals A to C of the above-mentioned counter CN1. The decoder produces an H signal from a prescribed output terminal out of output terminals Q0 to Q7 corresponding to input information. A circuit SW4 is a count switch which goes OFF in association with the running of a leading shutter screen, and circuit CN3 is a shutter time counting counter which has its reset terminal R connected to the switch SW4 through an inverter I5 and starts counting as the switch SW4 goes OFF. A digital comparator DCP1 compares what is in the decoder DE4 and what is in the counter CN3, and when their outputs coincide, produces an H signal from an output terminal OUT. The decoder, counter, and digital comparator form a shutter time counting timer circuit.

An RS flip-flop FF1 has its set terminal S connected to the inverter I5 and its reset terminal R connected to the output terminal OUT of the digital comparator DCP1. An inverter I4 is connected to an output terminal $\bar{Q}$ of the flip-flop FF1, and to the base of a transistor TR3 through a resistance R13. A magnet MG3 for retaining a follower shutter screen is connected to a collector of said transistor TR3. The flip-flop, inverter, transistor and magnet constitute a follower shutter screen control circuit.

Figure 2:
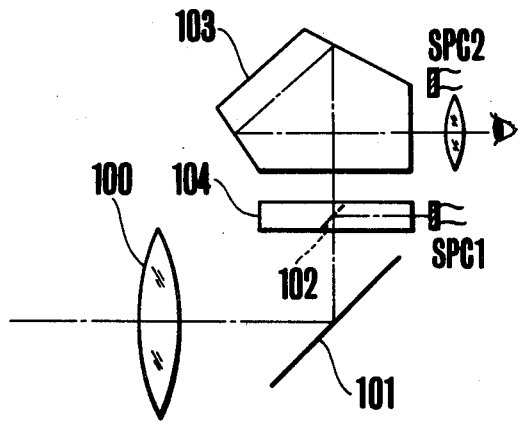
FIG. 2 is a schematic drawing to show a positioned relationship of a light receiving element shown in FIG. 1 with a finder optical system.

FIG. 2 shows the arrangement of the light receiving elements SPC1, SPC2 shown in FIG. 1 into a finder optical system of a camera. In the drawing, 100 is a photo-taking lens, 101 is a reflective mirror, and 104 is a focal plane. A half mirror 102 is provided at the focal plane and the luminous flux of only a center part of a photographic plane is directed to the light receiving element SPC1 by the half mirror. In this way, the partial light measuring (spot light measuring) is carried out by the light receiving element SPC1. Member 103 is a pentagonal prism and the above-mentioned light receiving element SPC2 is provided at the prism 103 to receive the total light volume from the focal plane 104 for carrying out the mean light measuring operation.

Operations of a camera according to the present invention are explained with reference to FIG. 1 and FIG. 2.

In the ordinary photographic mode, the switch SW9 is in the OFF state and the analog switch AS2 is conductive, while the analog switch AS1 is turned off. Therefore, an output of the light measuring circuit for the means light measurement, that is, a light measuring output based on the output of the light receiving element SPC2 is introduced into the OP Amp OP2 through the resistance R1. The mean light measuring output, an aperture value set at the resistances VR1, VR2, and a voltage corresponding to the film sensitivity information are applied to the OP Amp OP2 and a voltage corresponding to a shutter time will be produced. On the other hand, the switch Sw3 is ON before the release operation and SW9 is OFF, as mentioned above, so the AND gate A3 is opened and pulses from the pulse generator CG1 are introduced into the counter CN1. Since the count value of the counter CN1 is zero at its initial state, the output of the OP Amp OP3 is high, and the comparator CP1 produces an H level, while the counter CN1 is counting up. Therefore, the counter CN1 counts up and the output of the OP Amp OP3 gradually lowers along with the increase of the count value, then as the output of the OP Amp OP3 exceeds the output of the Op Amp OP2, the output of the comparator CP1 reaches an L level and the counter CN1 is placed in a down counting state. If there is no change in a state of brightness after the counter is placed in a down counting state, the counter CN1 will repeat an up count and a down count for every one pulse, and a digital value of a shutter time based on a mean light measuring output will be formed at the counter CN1.

When the shutter button is pressed down after that, the mirror 101 ascends and the switch SW3 goes OFF immediately before the same. In this way, the inverter I1 produces an L level to block the AND gate A3 for stopping the counting action of the counter CN1, thus memorizing a digital value corresponding to a shutter time in the counter CN1.

Also by a pressing down of the shutter button, a stop down of a diaphragm member, not shown, will be down to start a running of the leading shutter screen. This running of the leading shutter screen turns the switch SW4 OFF, and the resetting of the counter CN3 is released and the counting operation by the counter CN3 is started. The counting value of the counter CN3 is compared with a decoded signal of the digital value of the counter CN1 by the decoder DE1 and when both values match each other, that is, when the shutter time value memorized in the counter CN1 and the counted value of the counter CN3 coincide with each other, an H level signal is produced from the output terminal OUT of the comparator, then the H level signal is introduced into the reset terminal R of the flip-flop FF1. This causes the $\bar{Q}$ output of the flip-flop FF1 to have an H level, and an L level signal is impressed on a base of the transistor TR3 through the inverter I4, thereby turning the transistor TR3 OFF and shutting off the power supply to the magnet. The following shutter screen now runs thereby completing an exposure action.

The following refers to the case where the changeover is made to the EE lock mode during a light measurement for ordinary photography. Now, supposing that the light measuring action is being done in the above-mentioned ordinary photo-taking mode, then a shutter time based on an output of the mean light measuring circuit, that is, the output of the light receiving element SPC2 is A/D converted, and a digital value thereof will be formed at the counter CN1.

When an EE lock selecting member, not shown, is set in this state, the switch SW9 goes ON. This makes the analog switch AS1 conductive and the switch AS2 is blocked. An output of the partial light measuring circuit, that is, the output of the light receiving element SPC1 is now introduced into the OP Amp OP2 in place of the output of the mean light measuring circuit. Therefore, the output of the OP Amp OP2 is a voltage corresponding to the shutter time value based on the output of the partial light measuring circuit. On the other hand, as the switch SW9 goes ON, the output of the inverter I2 becomes H and a specific circuit consisting of the resistance R10 and the capacitor C1 functions. Hence, the output of the inverter I3 becomes L after the elapse of a prescribed length of time. This blocks the AND gate A3 and stops the counting action by the counter CN1.

Therefore, when a change over is made to the EE lock mode, a digital value corresponding to a shutter time based on the partial light measuring will be memorized in the counter CN1 regardless of a release action.

When the mean light measuring circuit is changed over to the partial light measuring circuit, as the switch SW9 is turned ON, the time constant circuit functions and the counting action of the counter CN1 is stopped after an elapse of a prescribed period of time. That is, a memorizing action is carried out. Therefore, even in a case when there is an output difference between the mean light measuring output and the partial light measuring output and in a case when it takes time to have the output of the mean light measuring circuit stabilized, etc., the output of the partial light measuring circuit will be completely A/D converted within the above-mentioned period of time. At the same time, the light measuring output will be stabilized. Thus, a digital value of a shutter time based on an accurate partial light measuring will be always memorized in the counter.

When the release button is pressed down after a shutter time value based on a partial measuring output is memorized at the counter CN1, as mentioned above, the shutter time control will be carried out according to a shutter time based on a partial light measuring output at a time the EE lock selecting member is set in a same manner as in the above-mentioned ordinary photo-taking mode.

Figure 3:
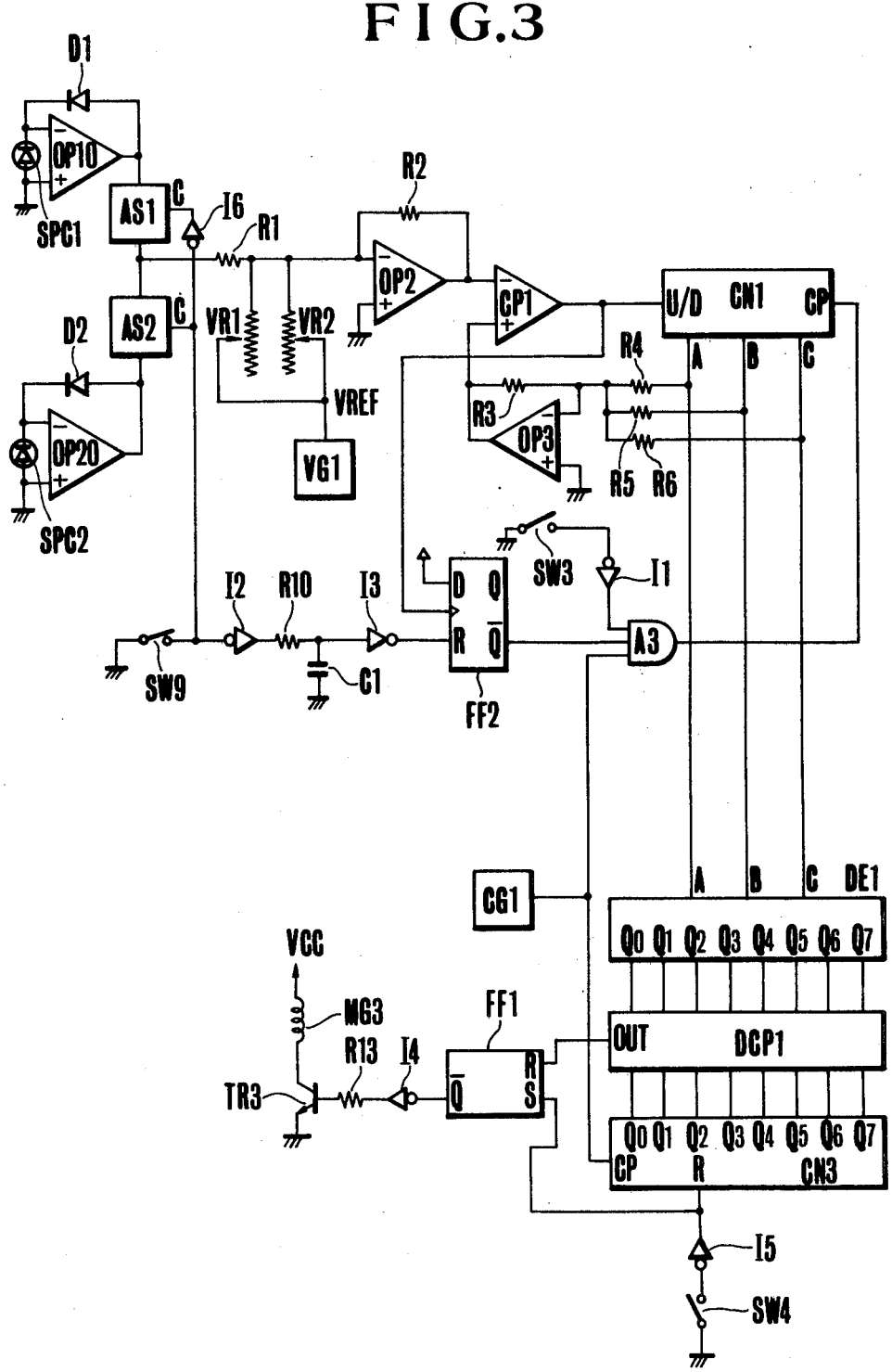
FIG. 3 is a circuit diagram to show another example of a camera according to the present invention.

FIG. 3 is a circuit diagram showing another example of the present invention. In this example, what is different from the example shown in FIG. 1 is that the memorization of the A/D converted output is blocked until the A/D conversion is completed at the time of the EE lock operation. In FIG. 3, the same circuit elements as in FIG. 1 are identified with the same reference characters. The example of FIG. 3 is different from the example of FIG. 1 in that the time constant of a time constant circuit consisting of the resistance 10 and the capacitor C1 is made much shorter than the time constant of a time constant circuit consisting of the resistance 10 and the capacitor C1 in the example of FIG. 1, and a flip-flop FF2 is provided and an inverter I3 is connected to a preset terminal R of the flip-flop FF2, while an output Q is introduced into an AND gate A3 and an output of the comparator CP1 is introduced into its clock terminal.

Since the operation in an ordinary photo-taking mode is the same as that in the example shown in FIG. 1, its explanation is omitted and an explanation of an EE lock operation follows.

Figure 4:
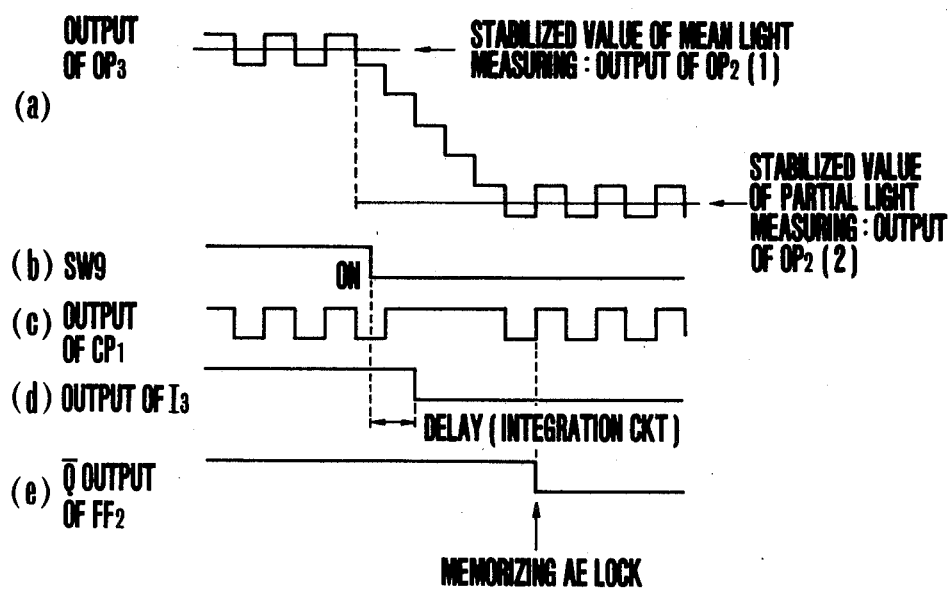
FIG. 4 is a schematic drawing to explain an operation of the example in FIG. 3.

Now, it is presumed that the light measuring and the A/D conversion action are performed in an ordinary photo-taking mode. When the EE lock selecting member is set in this condition, the switch SW9 goes ON as shown in FIG. 4(b). The light measuring mode is now changed from a mean light measuring mode to a partial light measuring mode as mentioned and an output of the OP Amp OP10 is introduced into the OP Amp OP2. As explained, when the mean light measuring output is stabilized after the A/D conversion is completed, the comparator CP1 repeats the L level and H level, but when the light measuring mode is switched to the partial light measuring mode as mentioned, the output level of the Amp OP2 changes from (1) to (2) in FIG. 4. This causes the comparator CP1 continuously to produce an H as shown in FIG. 4(c). Therefore, the counter CN1 is set to count up and continuously up counts clock pulses. The output of the Amp OP3 is gradually lowered by the up counting of the counter CN1 as shown in FIG. 4(a), and when the output of the Op Amp OP3 becomes lower than the output of the OP Amp OP2, the comparator CP1 produces an L signal. This terminates the up count and the A/D conversion of the partial light measuring output is completed. After this, unless the light measuring value changes, the comparator CP1 will repeatedly produce the H and L levels as mentioned above. And it will take a certain length of time from the moment the light measuring mode is changed over from a mean light measuring mode to a partial light measuring mode by setting an EE lock selecting member until the A/D conversion action of the output of the partial light measuring is completed. Therefore, it will be necessary to allow a counting operation by a counter during a period of time from the moment the light measuring mode is changed over until the A/D conversion is completed, and to prohibit the above-mentioned counting action after the A/D conversion is completed, for retaining a memory of the digital value at this time. Therefore, in the example of FIG. 3, the above-mentioned memorizing action is achieved by the A/D conversion completion signal at the time the A/D conversion is terminated after the EE lock operation.

That is, after the mode changeover is done and until the A/D conversion is completed as mentioned, the output of the comparator CP1 is maintained at H (a constant level) as shown in FIG. 4(c), then after the A/D conversion is completed the H level and L level outputs are repeatedly produced again. Therefore, the output level of the comparator CP1 is detected and when the output level of the comparator CP1 changes after and EE lock operation in the example of FIG. 3, the counting action of the counter CN1 is terminated for memorizing a digital value at the time the A/D conversion is completed.

In FIG. 1, the output of the inverter I3 is made L by setting the EE lock selecting member after an elapse of a prescribed length of time as shown in FIG. 4(d). Therefore, after an elapse of a prescribed period of time from the EE lock operation, the resetting of the flip-flop FF2 is released. On the other hand, since the clock terminal of the flip-flop FF2 is connected to the output terminal of the comparator CP1, the flip-flop FF2 is set in response to the output change (from L to H) of the comparator CP1, and $\bar{Q}$ output is changed to L. As explained, the output level of the comparator CP1 will not be changed until the A/D conversion is completed after the EE lock operation is done, and the output level is changed after the A/D conversion is completed. Therefore, the flip-flop FF2 places its Q output at L after the A/D conversion is completed, thereby blocking the AND gate A3 and holding the count value of the counter CN1.

In FIG. 3, the A/D conversion completion signal occurring after the EE lock operation is detected and a digital value corresponding to the light measuring output is to be memorized and retained.

Thus, in a camera according to the present invention, the light measuring mode is automatically switched from an ordinary mode to an EE lock mode by setting an EE lock selecting member. At the same time, delay means are activated to memorize a light measuring output after an elapse of a delay time controlled by the delay means. Therefore, when the brightness of a main object is measured during back lighting, for example, the main object brightness only can be memorized merely by setting the EE lock selecting member at a photograph position. Thus, the photographic operation can be greatly simplified and at the same time accurate memorization of a light measuring output can always be insured even if a light measuring mode is switched as mentioned.

Also, while a mean light measuring mode is shown, as the ordinary photo-taking mode in the above examples, other light measuring modes, for example, a center-weighted light measuring mode, etc. may be employed.

What I claim:

1. A camera allowing EE lock photography, comprising:
   (a) a light measuring circuit having a first light measuring mode suitable for ordinary photography and a second light measuring mode suitable for EE lock photography; and
   (b) EE lock select means for changing the mode of the light measuring circuit from a first mode to a second mode; and
   (c) an exposure control circuit having a memory means, said memory means being arranged upon selection of the second mode of said light measuring circuit by said EE lock select means to memorize a signal corresponding to that output of said light measuring circuit which occurred when said EE lock select means operated, and upon leaving said EE lock select means inoperative to memorize a signal corresponding to that output of said light measuring circuit which occurred when a release member was actuated,
   (d) said control circuit being arranged to operate such that when said EE lock select means is operated, the exposure control is performed regardless of the output of said light measuring circuit in the first mode but on the basis of the memorized signal in said memory means corresponding to that output of said light measuring circuit which was produced in the second mode as said EE lock select means was operated, and when said EE lock select means is not operated, the exposure control is performed regardless of the output of said light measuring circuit in the second mode but on the basis of the memorized signal in said memory means corresponding to that output of said light measuring circuit which was produced in the first mode.

2. A camera according to claim 1, wherein the first mode of said light measuring circuit is an average light measuring mode, and the second mode is a spot light measuring mode.

3. A camera comprising:
   (a) a light measuring circuit having a first light measuring mode suitable for ordinary photography and a second light measuring mode suitable for EE lock photography;
   (b) an A/D converter for converting the output of the light measuring circuit into a digital value;
   (c) release actuating means for producing a shutter release;
   (d) an exposure control circuit for memorizing a digital value A/D converted by the A/D converter in response to operation of the release actuating means for producing the shutter release and at the same time for performing an exposure control action based on said memorized value;
   (e) an EE lock selecting member;
   (f) mode changeover means for changing the light measuring mode from the first mode to the second mode in response to setting the EE lock selecting member; and
   (g) an EE lock circuit actuated by setting the EE lock selecting member, for performing the memorizing action in response to completion of the A/D conversion operation in response to the A/D converter after the EE lock selecting member is set irrespective of the operation of the release actuating means for shutter release.

4. A camera comprising:

(a) a light measuring circuit having a first light measuring mode and a second light measuring mode;
(b) mode selecting means for changing the first mode to the second mode;
(c) a control circuit including an A/D converter for converting the output of said light measuring circuit into a digital value, said control circuit memorizing a signal corresponding to the output of said A/D converter in response to a memory signal produced by shutter release operation;
(d) delay means actuated by operation of said mode selecting means for causing the control circuit to memorize the signal corresponding to the output of the AD converter at least after an elapse of time controlled by said delay means independently of the memory signal; and
(e) exposure control means for controlling an exposure on the basis of the value memorized in the control circuit.

5. A camera comprising:
(a) a light measuring circuit having a first light measuring mode and a second light measuring mode;
(b) mode selecting means for changing the first mode to the second mode;
(c) a control circuit including an A/D converter for converting the output of said light measuring circuit into a digital value, said control circuit memorizing a signal corresponding to the output of said A/D converter in response to a memory signal produced by shutter release operation;
(d) regulating means actuated by operation of said mode selecting means for causing the control circuit to memorize the signal corresponding to the output of the A/D converter after a completion of the A/D conversion operation; and
(e) exposure control means for controlling an exposure on the basis of the value memorized in the control circuit.

6. A camera comprising:
(a) a light measuring circuit having a first light measuring mode suitable for ordinary photography and a second light measuring mode suitable for EE lock photography;
(b) release actuating means;
(c) memory means for memorizing a signal corresponding to an output of the light measuring circuit in response to operation of the release actuating means;
(d) an exposure control circuit for controlling the exposure based on a value memorized in the memory means;
(e) EE lock selecting means;
(f) an EE lock control circuit for selecting the second mode of the light measuring circuit in response to setting the EE lock selecting means and for memorizing a signal corresponding to an output of the light measuring circuit in the memory means independently of the operation of the release actuating means;
delay means activated by setting the EE lock selecting means for causing the memory means to memorize a signal corresponding to an output of the light measuring circuit after an elapse of time controlled by said delay means.

7. A camera comprising:
(a) a light measuring circuit having a first light measuring mode suitable for ordinary photography and a second light measuring mode suitable for EE lock photography;
(b) a release actuating member;
(c) an exposure control circuit having a memory part and a control part for controlling an exposure based on a memorized signal at the memory part, said memory part memorizing a signal corresponding to an output signal of the light measuring circuit in response to operation of the release actuating member, and the control part performing an exposure control operation in response to operation of the release actuating member;
(d) an EE lock selecting member;
(e) an EE lock control circuit for changing the mode of the light measuring circuit from the first mode to the second mode in response to setting the EE lock selecting member and performing the memorization in response to setting the EE lock selecting member in place of the memorization of the memory part by operating the release actuating member; and
delay means actuated by setting the EE lock selected member so that the memory part memorizes a signal corresponding to an output of the light measuring circuit after an elapse of time controlled by said delay means.

8. A camera according to claim 6, which further comprises an A/D conversion circuit for A/D conversion of an output of the light measuring circuit so that the memory means memorizes the A/D conversion output.

9. A camera according to claim 7, which further comprises an A/D conversion circuit for A/D conversion of the output of the light measuring circuit so that the memory part memorizes the A/D converted output.

10. A camera comprising:
(a) a light measuring circuit having a first light measuring mode suitable for ordinary photography and a second light measuring mode suitable for EE lock photography;
(b) an A/D converter for converting the output of the light measuring circuit into a digital value;
(c) release actuating means;
(d) an exposure control circuit for memorizing a digital value A/D converted by the A/D converter in response to operating the release actuating means and at the same time performing an exposure control action based on said memorized value;
(e) an EE lock selecting member;
(f) mode changeover means for changing the light measuring mode from the first mode to the second mode in response to setting the EE lock selecting member; and
(g) an EE lock circuit actuated by setting the EE lock selecting member, for performing the memorizing action in response to completion of the A/D conversion operation in response to the A/D converter after the EE lock selecting member is set irrespective of the operation of the release actuating means.

11. A camera comprising:
(a) a light measuring circuit having a first light measuring mode and a second light measuring mode;
(b) mode selecting means for changing the first mode to the second mode;
(c) memory means for memorizing a signal corresponding to the output of said light measuring circuit in the first mode in response to a memory signal;
(d) delay means actuated by operation of mode selecting means for causing the memory means to memorize a signal corresponding to an output of the light measuring circuit in the second mode at least after an elapse of time controlled by said delay means; and
(e) exposure control means for controlling an exposure on the basis of the content of said memory means.

12. A camera according to claim 11, further including:
an A/D conversion circuit for A/D conversion of an output of the light measuring circuit to that the memory means memorizes the A/D conversion output.

13. A camera comprising:

(a) a light measuring circuit having a first light measuring mode and a second light measuring mode;
(b) mode selecting means for changing the first mode to the second mode;
(c) A/D converter for converting the output of the light measuring circuit into a digital value;
(d) memory means for memorizing a signal corresponding to the output of said AD converter when said selecting means selects said first mode;
(e) control means actuated by operation of said mode selecting means for causing said memory means to memorize the signal corresponding to the output of said A/D converter of at least after a completion of the A/D conversion operation; and
(f) exposure control means for controlling an exposure on the basis of the content of said memory means.

* * * * *